F. O. HARTMAN.
POWER SYSTEM.
APPLICATION FILED JAN. 6, 1921.

1,424,404.

Patented Aug. 1, 1922.

FRANK O. HARTMAN,
INVENTOR

BY *Richey, Slough & Vales*

ATTORNEYS

UNITED STATES PATENT OFFICE.

FRANK O. HARTMAN, OF MANSFIELD, OHIO, ASSIGNOR TO THE HARTMAN ELECTRICAL MANUFACTURING COMPANY, OF MANSFIELD, OHIO, A CORPORATION OF OHIO.

POWER SYSTEM.

1,424,404.   Specification of Letters Patent.   Patented Aug. 1, 1922.

Original application filed August 19, 1918, Serial No. 250,502. Divided and this application filed January 6, 1921. Serial No. 435,343.

*To all whom it may concern:*

Be it known that I, FRANK O. HARTMAN, a citizen of the United States, residing at Mansfield, in the county of Richland and State of Ohio, have invented certain new and useful Improvements in Power Systems; and I do hereby declare the following to be a full, clear, concise, and exact description of the invention, such as will enable others skilled in the art to which it appertains to make and use the same.

My invention relates to power systems, and more particularly to improvements in power systems in which a prime mover, such as a gas engine, is adapted to drive an electric generator to charge a storage battery, and in which the gas engine is started into motion by an electric motor which may be a starting generating dynamo capable of being used as a motor to crank the engine, and subsequently as a generator to charge the battery.

This application is a division of my application for improvements in circuit controlling mechanism, Serial No. 250,502, filed August 19, 1918, the controlling switch mechanism per se being claimed in the said application.

It is a particular object of my invention to provide a system whereby the apparatus may be controlled in a simple way, with accuracy and dispatch, and with a minimum of inexpensively constructed apparatus which may occupy a small space.

I also aim to provide circuit controlling mechanism whereby the apparatus of the system is controlled by a plurality of controlling devices, said controlling devices controlling said system in a simple, positive way, to accomplish the results hereinafter mentioned.

These and other objects of my invention and the invention itself will be understood from the following description of an embodiment of my invention.

Referring to the drawings.

Figure 1:
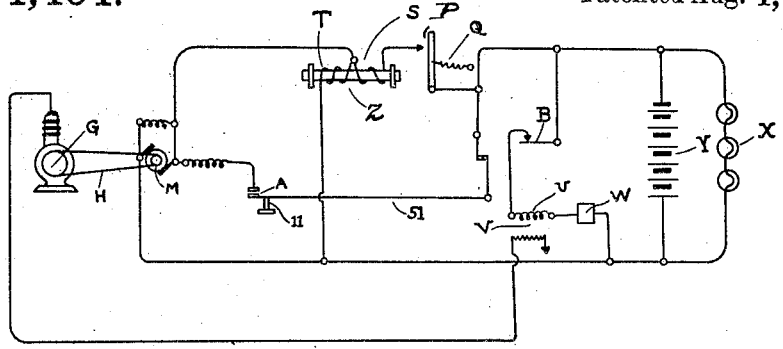
Fig. 1 shows electrical circuits and electrical apparatus diagrammatically represented, which illustrate an embodiment of my invention.

Referring now to the figures, in which like parts are denoted by like reference characters, at Y I show an accumulator to which, at X, is connected a load, such as incandescent lamps operating from the accumulator battery Y. At Z I show an automatic switch having a pair of electromagnet windings wound upon its core, one of the said windings being a relatively high resistance winding, the said winding being connected across the terminals of a starting generating dynamo M, and the other winding having relatively few turns, being serially connected between the said starting generating dynamo M and the accumulator Y, there being interposed in the circuit between the accumulator Y and the low resistance winding S a pair of normally open contacts adapted to be closed when the automatic switch is operated by a sufficient flow of current in a given direction through its winding T.

A gas engine is provided which is mechanically linked as by a belt H with the shaft of the starting generating dynamo M. The windings of the switches T and S are so proportioned relative to the contact set P that the contacts P will only be closed whenever current of a given strength passes through the winding T. The windings are also so related to the external circuit that when current is flowing from the generator to the storage battery, through the winding S, the magnetic effect assists that of the shunt current through the winding T. However, should the generator speed be so reduced that the voltage of the generator would be lower than the voltage of the battery Y, current would flow from the accumulator battery Y through the winding S in the opposite direction to that which the current previously flowed through said winding and this will oppose the effect of the current through the winding T and the contacts P of the switch Z will be opened by the retractile force of the spring Q or by gravity or by the agency of any other suitable equivalent retractile force. The contacts P being opened will remain open until the voltage of the starting generating dynamo M has again become higher than that of the battery Y when the shunt current through the winding T will again operate the switch.

Figure 2:
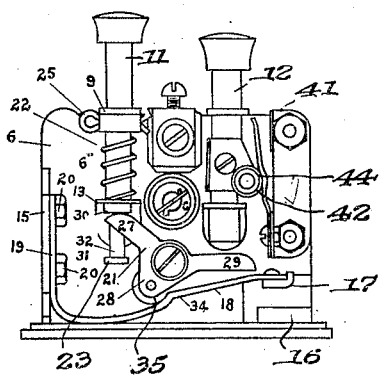
Fig. 2 shows a front elevation of a switch mechanism which is adapted to control the circuits and apparatus of Fig. 1.

In order to cause the starting generating dynamo M to operate to crank the engine G, I provide a set of power circuit contacts A which are adapted to be closed by a downward pressure upon the plunger 11 (see Fig. 2). A motor circuit is thus closed, comprising the circuit conductor 51, to connect the accumulator Y to the terminals of the starting generating dynamo M, and the starting generating dynamo operating as a motor will crank the engine. The plunger 11 when thus depressed to close the contacts A will also lift the plunger 12 by means of an intermediate lever link 21, having arms 27, 28 and 29, the arm 29 being caused to be raised when the arm 27 is caused to be lowered, and the rising arm 29 will push the plunger 12 to its uppermost operated position, wherein the roller 44 will cam the contact spring 42 against the stationary contact 41.

The contacts 42—41 form a contact set B, which in the circuit arrangement of Fig. 1 is serially inserted in the primary ignition circuit which comprises the primary winding U of a high tension transformer V, and a timer W, this primary ignition circuit being connected across the terminals of the accumulator Y.

The operation of the contacts A by the downward movement of the plunger 11 was accomplished practically simultaneously with the closure of the contacts B, the arm 28 of the lever 21 being advanced from left to right to cause the roller 35 to cam the spring 18 so that its outer end, which carries a heavy electric contact 17, will be forced downwardly to contact with the stationary contact plug 16. The operator having depressed the plunger 11 and having caused the starting generating dynamo M to crank the engine G, and having simultaneously closed the primary ignition circuit by the closure of contacts B, the engine will start to operate to drive the starting generating dynamo M, which will generate current and flow through the winding T of the switch Z. Spring 22 having moved the plunger back to its normal position or a sufficient amount so that when the flange 23 on the plunger pulls the roller 35 along the spring 18 until the roller passes the point 34 on the said spring, the retractile spring 18 will open the switch without being impeded in this action, by the shoulder 30 on the plunger which caused the closing of the switch. Spring 22 operates the flange 23 on the plunger to rock the cam off of dead center which permits spring 18 to open the switch with a quick break without any interference from the shoulder on the plunger and the spring 18 properly shaped as shown in Fig. 2, permits the quick opening of the switch.

Thus is accomplished the advantageous quick breaking of the motor starting circuit at the contacts A, which is effective to prevent continued arcing at the said contacts.

The plunger 12, however, when the plunger 11 is restored to its normal position, will remain in its upper operated position to which it had been lifted by the arm 29 of the lever member 21, thus maintaining closed the contacts B in the primary ignition circuit, so that the gas engine will continue to operate to drive the starting generating dynamo M, now operating as a generator.

When the voltage of the starting generating dynamo M reaches a predetermined high value, which is higher than that of the accumulator Y, current through the winding T of the switch will be sufficient to close the contacts P of the switch and a flow of current will result through the winding S of the switch Z to help maintain the contacts P closed, the said current passing through the said contacts to the accumulator Y to charge the same. The operator now may discontinue the charging of the accumulator at any desired time, by simply depressing the plunger 12 to restore it to its normal position, shown in Fig. 2. This will cause the roller 44 to pass along the spring 42 in a downward direction, to permit the end 40 of the spring 42 to separate from the stationary contact 41 to break the contact set B, thus rupturing the ignition circuit of the gas engine to stop the said gas engine.

The engine, stopping, will gradually come to rest, slowing down the starting generating dynamo M, whose induced voltage decreasing soon falls below the voltage of the accumulator Y, when current passing from the accumulator Y through the winding S of the switch Z in an opposite direction to the current previously flowing through the said winding will oppose the effect of the current through the winding T and the contacts P of the switch Z will be opened, thus restoring the circuit to normal position and the battery Y will be left disconnected from the starting generating dynamo M.

Having thus described my invention in a particular embodiment, I am aware that numerous and extensive departures may be made from the embodiment herein illustrated and described, but without departing from the spirit of my invention.

What I claim is:

1. In combination a gas engine, a starting generating dynamo, an accumulator, an ignition circuit for the said engine, a switch controlling the said ignition circuit, a second switch controlling the said dynamo, common means for operating both said switches, said starting generating dynamo switch being adapted to include the said starting generating dynamo and the said accumulator in a circuit to cause the said dynamo to be operated to crank the gas engine, said ignition circuit controlling switch being adapted when operated to energize the said ignition circuit by current from the said accumulator, whereby after the said engine is cranked, the said engine will operate as a prime mover to drive the said starting generating dynamo to charge the said accumulator, separate restoring means for each of said switches, the motor circuit switch restoring means being under the control of said common switch operating means, and means associated with said last named switch restoring means adapted to accelerate the rate of return movement of its associated switch to cause it to quickly break its contact.

2. In combination, an explosive engine, a starting motor therefor, an accumulator, an engine ignition circuit, a switch mechanism comprising a plunger, a pair of normally open contacts in the circuit adapted when closed to connect the motor to the accumulator, a spring carrying one of said contacts, camming means interposed between the said spring and the said plunger, a shoulder on the plunger adapted to engage the said camming means upon a forward movement of the plunger, said camming means engaging an inclined portion of the said spring to cam the said spring carried contact against the other contact, said camming means being thereby moved to engage a less inclined portion of the said spring where it attains a substantially dead center camming position, a second shoulder on the plunger and spaced therefrom adapted to engage the said camming means after a certain return movement of the plunger to give it an initial impulse to move it from the dead center position to the said inclined spring portion, said spring thereafter accellerating the return movement of the said camming means at a speed rate greater than the speed rate of return of the said plunger to cause a quick breaking of the contact, a second switch for the said mechanism controlling the said ignition circuit, said second switch adapted to have its contact operated when the said plunger is advanced to switch contact closing position and separate manually operated restoring means for the said ignition switch contacts.

3. In combination, a gas engine, a motor adapted to crank the gas engine, an ignition circuit for the said engine, a switch controlling the said ignition circuit, a second switch controlling the said motor, common means for operating both said switches, separate restoring means for each of said switches, the motor circuit switch restoring means being under the control of said common switch operating means, and means associated with said last named switch restoring means adapted to accelerate the rate at which its associated switch is restored.

4. In combination, a starting generating dynamo, a gas engine, an ignition circuit for the gas engine, an accumulator, a divided circuit for interconnecting the accumulator and the said starting generating dynamo, said divided circuit having a pair of branches, a motor starting switch in one of said branches, an electro-magnetic winding and a normally open electromagnetically-controlled switch contact set in the other branch, an ignition switch for the said ignition circuit, common means for operating both said switches, a second electromagnetic winding, said winding being adapted to convey current from the said starting generating dynamo when said switches are operated, separate restoring means for each of said switches, the restoring means for the motor starting circuit switch being adapted to be operated when the said common means is withdrawn from switch operating position, and means whereby said ignition switch may be subsequently independently restored to stop the gas engine.

5. In combination, a gas engine, a motor adapted to crank the gas engine, an ignition circuit for the said engine, a switch controlling the said ignition circuit, a second switch controlling the said motor, means controlling said motor switch including a plunger, an intermediate member through which the plunger controls the switch, a shoulder on the plunger for causing the intermediate device to close the switch and a catch on the plunger located a predetermined distance from the shoulder for causing the intermediate device to release the switch and cause the opening of the same when and only when the plunger has been restored a predetermined distance.

In witness whereof, I have hereunto signed my name this 24th day of December, 1920.

FRANK O. HARTMAN.